Oct. 18, 1966  D. J. CARRÉ  3,279,802
CONTROL SURFACE SHAFT SEAL
Filed March 10, 1964  2 Sheets-Sheet 1

INVENTOR.
DAVID J. CARRÉ
BY
Leon D. Rosen
ATTORNEY

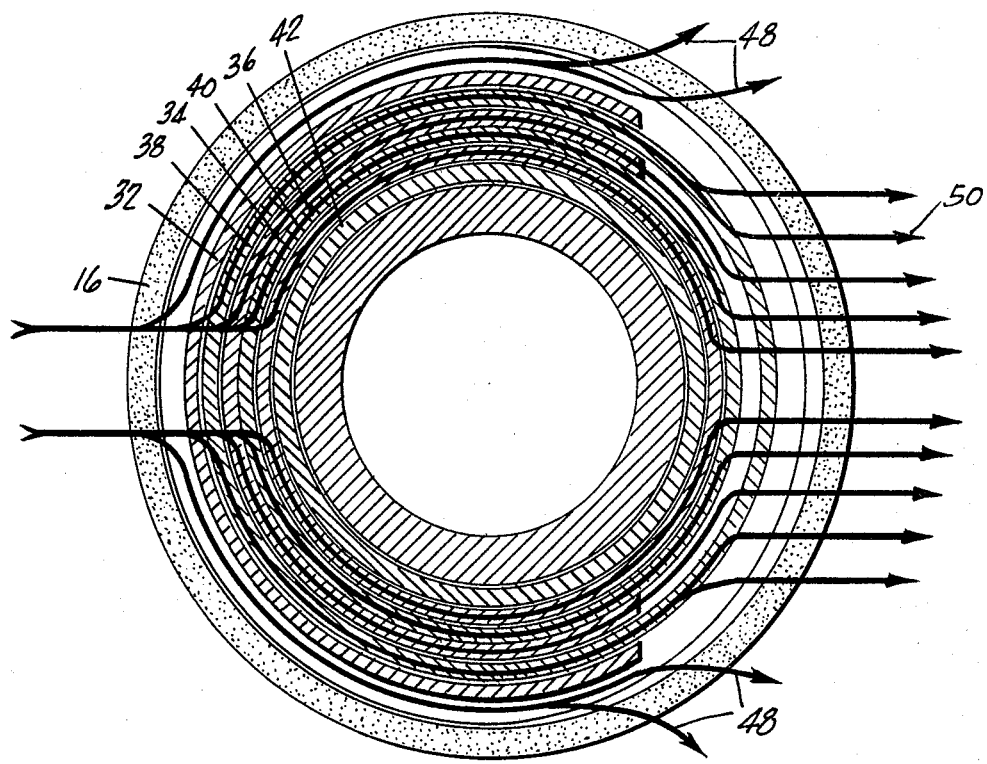

United States Patent Office 3,279,802
Patented Oct. 18, 1966

3,279,802
CONTROL SURFACE SHAFT SEAL
David J. Carré, Palos Verdes Estates, Calif., assignor to Douglas Aircraft Company, Inc., Santa Monica, Calif.
Filed Mar. 10, 1964, Ser. No. 350,703
8 Claims. (Cl. 277—57)

This invention relates to seals and more particularly to labyrinth seals between parts which have relative motion.

Missiles and various specialized machinery which move at great speeds relative to a gaseous environment sometimes employ movable shafts which must extend into the rapidly flowing gaseous medium. For example, some missiles employ fins for guidance, the fins being attached to rotatable shafts extending from the missile body. The shafts encounter great pressures and temperatures as the missile travels at hypersonic speeds. In order to enable the turning of the fins, the machinery within the missile which turns the shaft must be sealed from the external temperatures and pressures and the shaft must be allowed to deflect somewhat and still be rotatable and sealed. It can be appreciated that the sealing of the missile interior from the external environment near the shaft, where temperatures of trousands of degrees Fahrenheit and pressures of hundreds of pounds per square inch are encountered and wherein ablation particles removed from the missile surface are often encountered, while allowing for a shaft deflection, can be a formidable task. The seal of this invention provides a relatively simple sealing assembly for shafts extending from missile bodies and other similar applications, wherein high pressures and/or temperatures are encountered on only one side of the seal. In the case of a missile, this side is the forward portion of the seal which receives the full force of the ambient atmosphere through which the missile travels.

The seal of the present invention generally employs a labyrinth arrangement of several seals, the clearance between the mating portions of the labyrinth being very small in the side of the seal which receives the full air blast and being very large on the diametrically opposite side of the seal wherein is encountered a low pressure or vacuum-like area, to vent any gases which pass partially through the labyrinth. In order to further reduce the temperatures and pressures which the forward side of the labyrinth must seal against and protect the labyrinth from the errosive effects of particles from an ablative insulation, a slot is provided on the forward part of the seal. Particles of ablation are carried past the labyrinth inlet gap by virtue of their inertia, impinge upon the bottom of the slot, and are carried around the shaft (in the slot) and exhausted to the sides. The slot is of sufficient depth that the shock wave produced by the shaft lies within the slot, so that the side of the slot wherein is situated the opening of the labyrinth seal, is spaced forward of the shock wave. The shock wave is an area where very high temperatures and pressures are encountered and only a small distance from it, the temperatures and pressures are considerably reduced. Any of the high temperature and high pressure atmosphere which passes through the front portion of the labyrinth is sealed from the inside of the missile by conventional types of O-rings. However when gases reach the O-ring or conventional types of seals, the temperatures and pressures are sufficiently reduced that adequate sealing can be obtained.

Accordingly, one object of the present invention is to provide an improved dynamic seal.

Another object of the invention is to provide a dynamic seal for shaft-like structures which extend from bodies moving at supersonic speeds relative to the ambient atmosphere.

A further object of the invention is to provide a seal for withstanding high temperatures and pressures which exist on only one circumferential side thereof.

A still further object is to provide an improved seal for a shaft-like member which extends from the body wherein the shaft-like member is subject to bending.

These and other objects of the invention and a more complete understanding thereof may be had by reference to the accompanying description and claims taken in conjunction with the following drawings in which:

FIGURE 3 is a plan view taken along the line 3—3 of FIG. 2.

Figure 1:
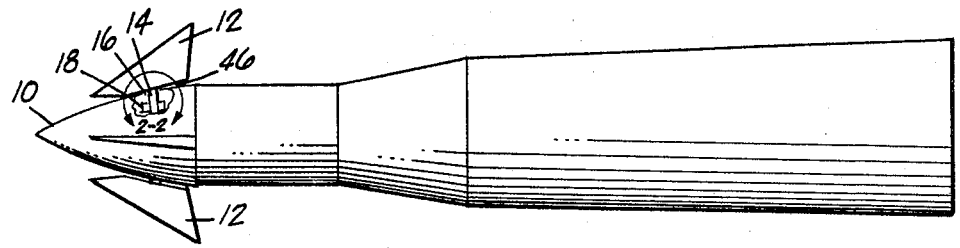
FIGURE 1 is a sectional view of a missile showing a fin mounted on a shaft protected by a seal constructed in accordance with the present invention.

We refer now to the drawings and more particularly to FIG. 1 which illustrates one embodiment of the present invention shown employed on a missile. The missile 10 is guided by fins 12 which are rotatably mounted to the missile by shafts 14. The shafts 14 can be rotated by mechanisms within the missile (not shown) to steer the missile. A missile typically flies at hypersonic speeds of perhaps eight times the speed of sound. The forward part 16 of the shaft encounters high energy shock waves. At the front portion of the shock wave, temperatures on the order of magnitude 5,000 degrees Fahrenheit and pressures on the order of magnitude of 200 pounds per square inch are typically encountered.

The internal mechanisms of the missile must be protected from these high temperatures and pressures and a seal 18 is provided around the shaft to seal the missile interior. Seal 18 must not only allow the shaft 14 to rotate within it while sealing against very high temperatures and pressures, but must also allow some deflection of the shaft 14 as the fin 12 to which it is attached sustains aerodynamic and inertial loads. All of this must preferably be done without requiring the development of exotic materials for lubrication at extremely high temperatures, inasmuch as it may be impossible to develop such materials.

Figure 2:
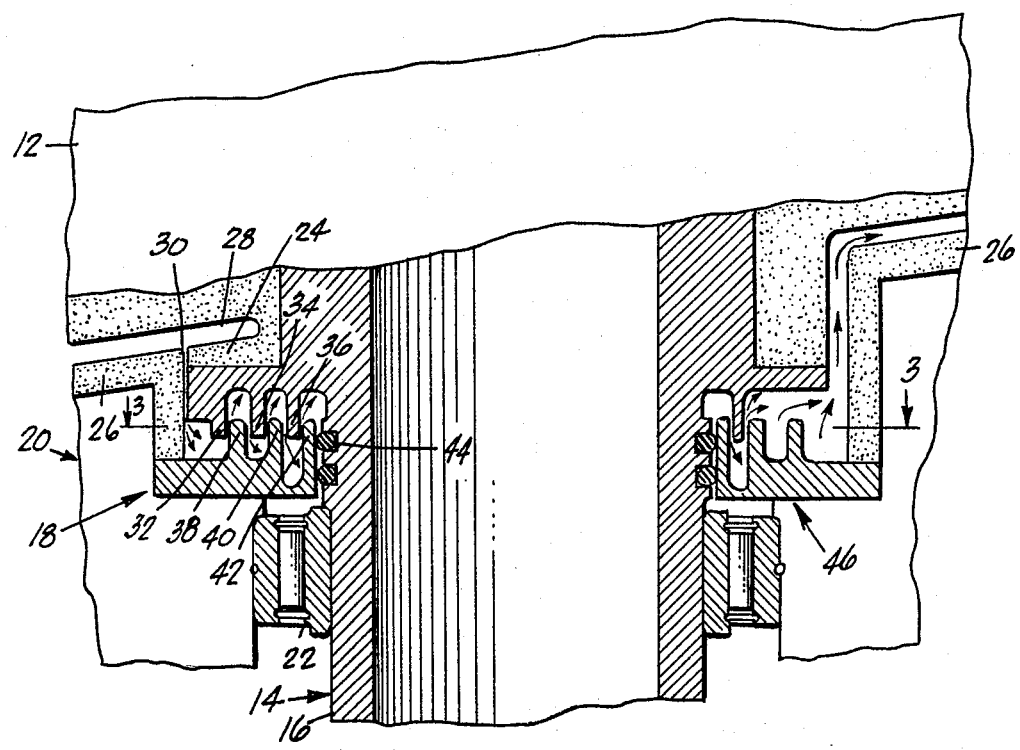
FIGURE 2 is a detailed view of area 2—2 of FIG. 1.

In the seal of the present invention shown in greater detail in FIG. 2 the shaft 14 is rotatably mounted within the missile body 20 by shaft bearings 22. The shaft is generally constructed of stainless steel but includes a covering 24 of a high temperature resistant material on the shaft portions which are exposed to the atmosphere and the high temperatures of hypersonic shock waves. A material such as Refrasil, a trade name of the H. I. Thompson Fiberglass Company of Los Angeles, California, for vitreous fibers of silicone oxide in a phenolic resin, may be used as the covering material 24. A similar covering 26 is provided on the missile body to protect it against high temperatures.

The shock waves encountered by objects traveling at high speeds generally remain a certain distance, e.g. several tenths of an inch, from the front of the object. It is at this shock wave front where the highest temperatures and pressures are encountered. The covering 24 of the shaft 14 includes a slot 28 for containing the shock wave front. The area 30 where the seal of the invention opens to the ambient atmosphere is situated a spaced distance from the shock wave front and thus is in a region of lower temperatures and pressures than those which exist at the shock wave front. Although the slot 28 is useful in containing the shock wave front, one of its most important uses is to control the movement of particles ablated from the surface of the missile. Often times, missile surfaces are provided with ablative coatings or coatings which can be evaporated or removed when high temperatures are encountered, to help in cooling the missile surface. When the ablative coatings are heated, particles are often emitted. These particles could enter the space 30 between the shaft 16 and the surrounding seal portion and damage the seal, or enter past the seal into the bearings and damage them. These particles move past the opening 30 and into the slot 28, and strike the bottom of the slot 28 where they do no damage. The covering 24 should be thick enough to withstand this erosive effect for the desired life of the seal. The slot 28 extends about 200° around the missile and tapers to a small depth at the sides; this enables ablative particles to be carried to the side of the shaft where they are exhausted.

The seal assembly comprises several labyrinths composed of shaft baffles 32, 34 and 36 attached to the shaft 14 and corresponding missile body baffles 38, 40 and 42 fixed to the missile body. On the forward side 16 of the shaft, the clearance between the closest portions of the shaft 14 and the missile body 20 and the clearance between the shaft and missile body baffles is very small. Gases entering the seal through the small annular gap 30 into the first annular vented chamber experience an expansion and consequent temperature reduction. This reduction in pressure and temperature and exhausting to the rear is repeated as the seal is penetrated to the O-ring where the final temperature and pressure are greatly reduced. Finally, O-ring seals 44 are provided to assure positive sealing between the missile body and shaft. The O-rings are at the deepest part of the seal and thus must withstand only relatively small temperatures and pressures.

The clearances between the shaft 14 and missile body 20 and between the various shaft and missile body baffles cannot be less than a certain amount because the shaft 14 must be capable of deflecting under load. Thus, although the temperatures and pressures at deeper portions of the seal are reduced there are still substantial amounts of high temperature gases which enter from the ambient atmosphere and proceed to within some depth of the seal. In the seal of this invention, the gases which do enter from the ambient atmosphere are expelled at the rearward portion 46 of the seal. The venting of gases which pass partially through the labyrinth is accomplished by providing shaft baffles 32 and 34 as shown in FIG. 2 which extend only partially about the shaft, more than 180° and less than 360°, so that there are no barriers at the rearward portion 46 of the seal and gases can easily flow through the labyrinth and out of the seal. The clearances at the rearward portion are, of course, many times greater than at the forward portion. Under the conditions in which the seal is used there is only a small pressure at the rearward portion of the seal so that any gases which have been trapped in the labyrinth will easily flow out at the rear. The clearance between the shaft 14 and the covering 26 of the missile body is very large at the rearward portion of the seal so that vented gases flow out with very little obstruction. Inasmuch as there is provided the combination of small clearances at the front portion of the seal to reduce the initial entrance of gas into the seal, a labyrinth structure which limits the temperatures and pressures at deeper portions of the seal, and large clearances at the rearward portions of the seal which enables the venting of gas, commercially available O-ring seal 44 can be used to seal the interior of the missile.

As illustrated in FIG. 3, it is generally found that most of the gas entering the front of the seal is expelled at the side of the seal as indicated by flow lines 48 where the clearances increase rapidly. The other flow lines 50 show the flow of gas at other, more rearward portions of the seal.

One of the shaft baffles 36 extends completely around the seal to reduce the entrance of high pressured gases through the labyrinth in the event that the missile should be so turned that the rearward portion of the seal encounters high pressures.

Thus, the shaft and seal assembly of the present invention provides a special purpose protective seal, which utilizes available material for sealing a movable shaft against very high temperatures and pressures under adverse conditions.

While a particular embodiment of the invention has been shown and described herein it should be understood that additional modifications may be made without departing from the scope of the invention as defined in the following claims.

I claim:
1. A seal assembly comprising:
   a fixedly mounted ring-shaped outer portion;
   a shaft portion mounted within and coaxially to said ring-shaped outer portion;
   sealing means on said outer portion disposed adjacent to said shaft portion, said sealing means at a first location defining a gas restrictive clearance between said outer portion and said shaft portion, and at a second location diametrically opposite said first location, a relatively larger and non-gas restrictive clearance is defined to thereby enable the venting of gases between said outer portion and said shaft portion.
2. A seal assembly as defined in claim 1 wherein:
   said sealing means comprises at least one annular ring-shaped baffle mounted on said outer portion and extending more than 180° but less than 360° around said sealing means.
3. A seal assembly comprising:
   an outer portion having an upper surface;
   a shaft portion mounted within said outer portion and including a slot extending partially around said shaft portion, said slot having a first side which forms an extension of the upper surface of said outer portion and a second side which is spaced from said upper surface, the depth of said slot being sufficient to contain the maximum pressure zone of shock waves emanating from the base of said slot when said seal assembly moves with respect to ambient atmosphere.
4. A seal assembly comprising:
   an outer portion;
   a shaft portion rotatably mounted within said outer portion;
   a labyrinth sealing means disposed between said outer portion and said shaft portion, said labyrinth sealing means being formed of at least one pair of baffles, said sealing means restricting the passage of gas at a first circumferential location and venting gases at a second circumferential location, said second circumferential location being approximately diametrically opposite to said first location.
5. A seal assembly as defined in claim 4 wherein:
   said outer portion has an external surface;
   said shaft portion includes an external slot extending circumferentially of said shaft portion, said slot having one side flush with said external surface of said outer portion.
6. A seal assembly as defined in claim 4 including:
   an elastomer O-ring seal disposed between said shaft portion and said labyrinth sealing means of said outer portion, whereby said O-ring seal is not directly exposed to the ambient atmosphere.

7. A seal assembly as defined in claim 4 including:
said outer portion and shaft portion having external surfaces exposed to atmosphere, said external surfaces being covered with a high temperature resistant material.

8. A seal assembly as defined in claim 5 wherein:
said slot has a sufficient depth to contain the highest pressure zone of shock waves emanating from the base of said slot when said seal assembly is moved relative to the ambient atmosphere, whereby a minimum of ambient atmosphere flows between said outer portion and said shaft portion along said one circumferential side.

References Cited by the Examiner

UNITED STATES PATENTS

| | | | |
|---|---|---|---|
| 2,439,917 | 4/1948 | Anderson | 308—187.1 X |
| 2,868,574 | 1/1959 | Rich | 308—36.1 X |
| 3,144,280 | 8/1964 | Sorenson | 308—36.1 |
| 3,159,969 | 12/1964 | Ernst et al. | 308—36.1 X |

SAMUEL ROTHBERG, *Primary Examiner.*

BENJAMIN A. BORCHELT, *Examiner.*

V. PENDEGRASS, *Assistant Examiner.*